Sept. 7, 1926.
E. R. FITCH
1,598,812
VARIABLE LOAD BRAKE
Filed Jan. 21, 1925
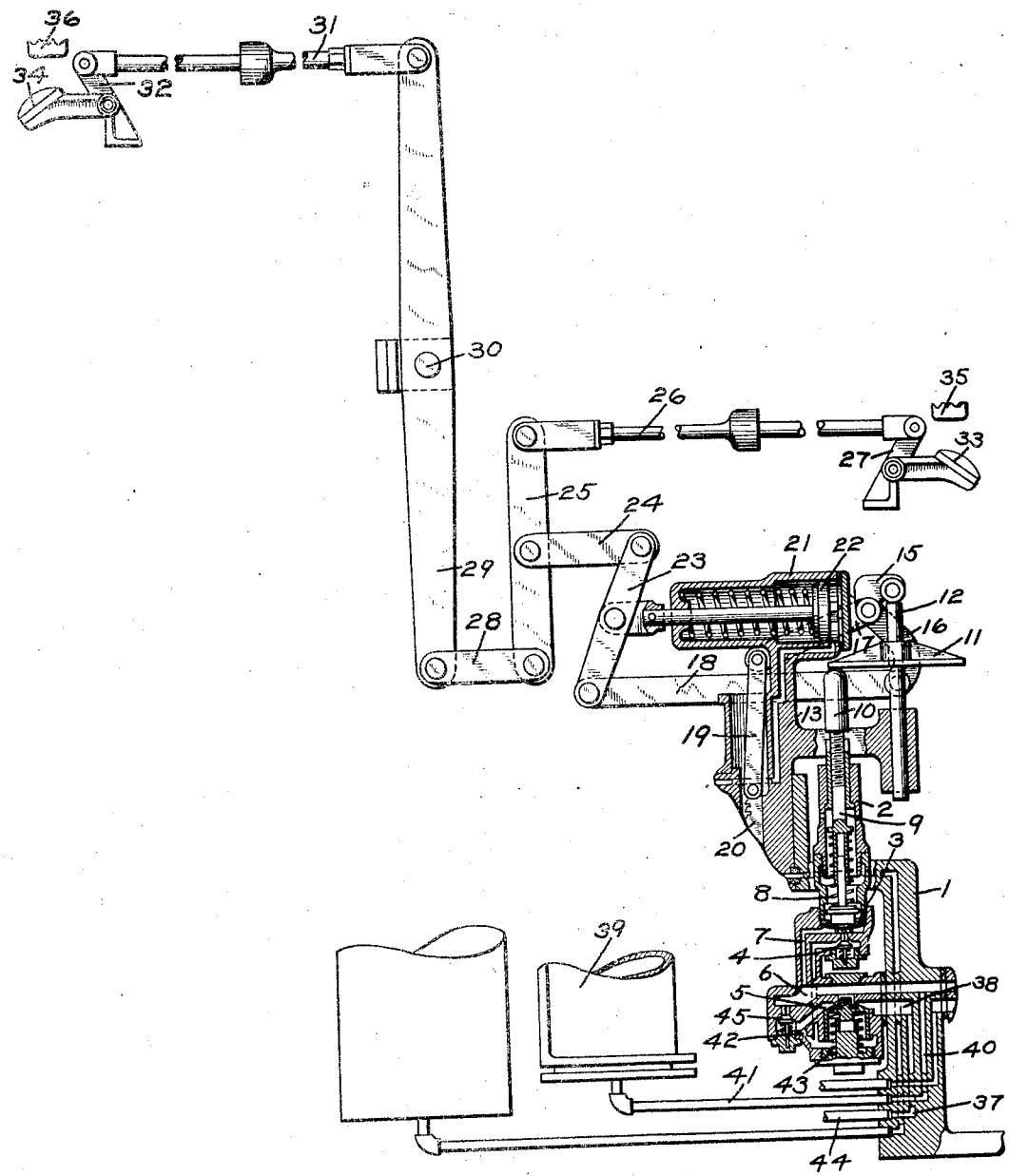
INVENTOR
ELLERY R. FITCH
BY Wm. M. Cady
ATTORNEY Patented Sept. 7, 1926.

1,598,812

UNITED STATES PATENT OFFICE.

ELLERY R. FITCH, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA.

VARIABLE-LOAD BRAKE.

Application filed January 21, 1925. Serial No. 3,758.

This invention relates to fluid pressure brakes, and more particularly to a variable load brake.

It has heretofore been proposed to regulate the braking power according to the load on the car, but with a load regulated brake, it often happens that the load at one end will exceed that at the other end of the car, and for this reason, a variable load brake, which is adjusted from a single point on the car, will not accurately regulate the braking power according to the load on the car, as a whole.

The principal object of my invention is to provide a variable load brake mechanism having means jointly controlled from different points on the car for regulating the braking power.

In the accompanying drawing, the single figure is a diagrammatic view, partly in section, of a variable load brake mechanism with my invention applied thereto.

For regulating the braking power, a brake cylinder pressure limiting valve device may be employed, such as described in the prior patent of Clyde C. Farmer, No. 1,505,950, dated August 26, 1924, and comprising a casing 1 containing a flexible diaphragm 3 for operating a valve 4, which controls the operation of a brake cylinder supply valve 5. The diaphragm 3 is subject on one side to brake cylinder pressure supplied from chamber 6 through passage 7, the chamber 6 being connected to the brake cylinder by pipe 41, and on the other side to the pressure of a compressible spring 8.

The adjustment of the spring 8 is accomplished through the movement of a plunger 9, the upper end of which carries a cap nut 10. The cap nut 10 engages a plate 11 carried by a slidable guide rod 12.

Pivotally mounted on a part of a bracket casting 13 is a crank member having crank arms 15, 16 and 17. The crank arm 15 is adapted to engage the upper end of the rod 12, while crank arm 16 is pivotally connected to a link 18. The crank arm 17 is connected through link 19 to latch bar 20, which is only partially shown but which corresponds with the construction shown in Patent No. 1,505,950, hereinbefore referred to.

As in the above mentioned patent, a strut cylinder 21 is employed, containing a piston 22, to the stem of which is pivotally attached a lever 23. One end of the lever 23 is pivotally connected to the link 18, while the other end is pivotally connected to a link 24, which in turn is connected to a lever 25.

The lever 25 is pivotally connected at one end to a pull rod 26, which in turn is connected to one arm 27 of a bell crank located at one end of the car and fixed to the car body, and having another arm 33, which is adapted to engage a member 35 carried by the car truck. The opposite end of the lever arm 25 is connected by a link 28 to one end of a lever 29, which is fulcrumed on the car at a point 30, the other end of the lever 29 being connected to a pull rod 31, which in turn is connected to an arm 32 of a bell crank located at the other end of the car and fixed to the car body and having an arm 34, which is adapted to engage a member 36 carried by the car truck.

In operation, when the car is brought to a stop, fluid under pressure is supplied to the face of strut cylinder piston 22, in the manner described in Patent No. 1,505,950, and which it is not deemed necessary to further describe, since the same is not material to the present invention. The fluid under pressure acting on the piston 22 causes the same to move out, thereby operating the lever mechanism and causing the member 33 of the bell crank at the right of the drawings and the member 34 of the bell crank at the left of the drawings, to engage respectively the members 35 and 36 located on the car trucks at the respective ends of the car.

As the load on the car is increased or decreased at either end of the car the position of the members 35 and 36 will be correspondingly changed in respect to the members 33 and 34. This change in position of the members 35 and 36 effects a corresponding movement of the arms 33 and 34, which is transmitted, through the various levers to link 18, thence through crank arms 15 and 16 to rod 12, plate 11, and consequently plunger 9, thereby compressing spring 8 accordingly. It will be noted that the rod 12 is depressed by an amount corresponding with total movement of both the members 35 and 36.

As in Patent No. 1,505,950, when the car is started and the car doors are closed, the member 20 is locked and through the link 19 holds the crank member 16 in its adjusted position. At the same time, fluid is exhausted from piston 22, so that piston 22 is moved inwardly, causing the lever mechanism to move the arms 33 and 34 of the bell crank out of engagement with the members 35 and 36.

If it is desired to effect an application of the brakes, fluid under pressure will be supplied from the brake application valve means, through pipe 44 and passage 37 to chamber 38 and acts on the exposed area of the valve piston 5. Said valve piston is then unseated, permitting flow of fluid to chamber 6, which communicates with the brake cylinder 39 through passage 40 and pipe 41.

The pressure of fluid supplied to the brake cylinder is also supplied through passage 7 to diaphragm 3, and when the pressure in the brake cylinder has been increased to a predetermined degree, corresponding with the previous adjustment of spring 8, in accordance with the load on the car, the diaphragm 3 will be moved, permitting the valve 4 to close. Any further increase in pressure supplied to chamber 38 then flows through passage 42 to the spring side of the valve piston 5, and since this pressure cannot now flow to the brake cylinder past the valve 4, it will equalize on both sides of the valve piston and a spring 43 will cause said valve to seat, thereby cutting off further supply of fluid to the brake cylinder.

It will now be evident that the degree of compression of the spring 8 and the braking power, as determined by the spring 8 acting on the diaphragm 3, is dependent upon the joint action of the load on the car at two different points, such as the opposite ends of the car and that the braking power is therefore adjusted to correspond with the total load on the car and regardless of whether or not one end of the car is more heavily loaded than the other.

Having now described my invention, what I claim as new and desire to secure by Letters Patent, is:—

1. In a load brake apparatus, the combination with mechanism for regulating the braking power, of means subject to the load on the car at different points for adjusting said mechanism to provide braking power varying according to the collective load on the car at said points.

2. In a load brake apparatus, the combination with mechanism for regulating the braking power, of means operative according to the load on the car at different points for collectively effecting the adjustment of said mechanism to vary the braking power according to the collective load.

3. In a load brake apparatus, the combination with mechanism for regulating the braking power, of a member associated with the car truck at each end of the car, a member movable with the car body for engaging each car truck member, and a system of levers for operatively connecting said car body members to said mechanism for adjusting said mechanism to provide braking power according to the load on the car.

4. In a load brake apparatus, the combination with mechanism for regulating the braking power, of a member at each end of the car movable according to the load on the car, and a lever mechanism operatively connecting said members to said mechanism for adjusting said mechanism.

5. In a load brake apparatus, the combination with mechanism for regulating the braking power, of a member associated with the car truck at each end of the car, a member movable with the car body and adapted to engage each truck member, a lever mechanism operatively connecting said car body members with said mechanism, and a piston operated by fluid under pressure for operating said lever mechanism to cause said car body members to engage said truck members.

In testimony whereof I have hereunto set my hand.

ELLERY R. FITCH.